United States Patent
Mochizuki et al.

(10) Patent No.: US 9,353,249 B2
(45) Date of Patent: May 31, 2016

(54) THERMOPLASTIC RESIN COMPOSITION FOR REDUCTION OF SQUEAKING NOISES AND STRUCTURE OF REDUCED SQUEAKING NOISES

(75) Inventors: Isamu Mochizuki, Tokyo (JP); Kazuya Egawa, Tokyo (JP)

(73) Assignee: TECHNO POLYMER CO., LTD., Tokyo (JP)

( * ) Notice: Subject to any disclaimer, the term of this patent is extended or adjusted under 35 U.S.C. 154(b) by 0 days.

(21) Appl. No.: 14/241,219

(22) PCT Filed: Aug. 31, 2012

(86) PCT No.: PCT/JP2012/072155
§ 371 (c)(1),
(2), (4) Date: Feb. 26, 2014

(87) PCT Pub. No.: WO2013/031946
PCT Pub. Date: Mar. 7, 2013

(65) Prior Publication Data
US 2014/0206803 A1  Jul. 24, 2014

(30) Foreign Application Priority Data
Sep. 2, 2011  (JP) .................................. 2011-191596

(51) Int. Cl.
*C08L 23/16* (2006.01)
*C08L 51/06* (2006.01)
(Continued)

(52) U.S. Cl.
CPC ............... *C08L 19/00* (2013.01); *C08F 255/04* (2013.01); *C08L 25/12* (2013.01); *C08L 33/20* (2013.01); *C08L 51/006* (2013.01); *C08L 51/06* (2013.01); *B60R 13/02* (2013.01)

(58) Field of Classification Search
CPC ......... C08L 23/16; C08L 23/26; C08L 51/04; C08L 51/06; C08L 83/04; C08L 51/00; C08K 5/0016; C08K 5/5415; C08K 5/54; C08K 3/34

USPC ............. 525/416, 240, 191, 70, 331.7, 326.1, 525/374; 524/570, 581, 580
See application file for complete search history.

(56) References Cited

U.S. PATENT DOCUMENTS 4,053,539 A * 10/1977 Delsarte ........................ 525/193
4,739,001 A *  4/1988 Okamoto .............. C08L 33/062
                                                524/264

(Continued)

FOREIGN PATENT DOCUMENTS

EP        439 443 A2 *  1/1991   ............... C08K 5/11
EP        2418246 A1    2/2012
(Continued)

OTHER PUBLICATIONS

Katakabe et al. (JP 2010-158961 A) Jul. 22, 2010; abstract and translation in English.*
(Continued)

*Primary Examiner* — Rip A Lee
(74) *Attorney, Agent, or Firm* — Kratz, Quintos & Hanson, LLP

(57) ABSTRACT

Provided is a thermoplastic resin composition [X] for reduction of squeaking noises containing a rubber-reinforced vinyl resin [A] obtained by polymerizing a vinyl monomer [b1] in the presence of an ethylene-α-olefin rubber polymer [a1] having Tm (melting point) of 0° C. or higher, wherein an amount of silicon contained in the thermoplastic resin composition [X] is 0.15% by mass or less based on 100% by mass of the thermoplastic resin composition [X]. According to the present invention, a structure can be provided, which is characterized in that squeaking noises that are generated when members rub against each other is remarkably reduced, that an effect of reducing squeaking noises is maintained without deterioration even when placed under high temperature for a long time, and that impact resistance and molded appearance are superior.

14 Claims, 1 Drawing Sheet

(51) Int. Cl.
- *C08L 19/00* (2006.01)
- *C08L 33/20* (2006.01)
- *C08F 255/04* (2006.01)
- *C08L 25/12* (2006.01)
- *C08L 51/00* (2006.01)
- *B60R 13/02* (2006.01)

(56) References Cited

U.S. PATENT DOCUMENTS

| | | | |
|---|---|---|---|
| 6,160,052 A * | 12/2000 | Nozawa | C08F 279/02 524/267 |
| 6,737,453 B2 * | 5/2004 | Sumimoto et al. | 524/127 |
| 7,012,205 B1 * | 3/2006 | Han | 200/252 |
| 7,083,844 B2 * | 8/2006 | Yamamoto | 428/156 |
| 7,135,085 B2 * | 11/2006 | Aso et al. | 156/240 |
| 2009/0226727 A1 * | 9/2009 | Higaki | 428/412 |
| 2012/0034467 A1 * | 2/2012 | Nagasaka et al. | 428/412 |
| 2013/0217817 A1 * | 8/2013 | Mochizuki | C08L 69/00 524/262 |

FOREIGN PATENT DOCUMENTS

| | | | | |
|---|---|---|---|---|
| JP | 49-109438 | * | 10/1974 | |
| JP | 63-56267 B2 | | 11/1988 | |
| JP | 1-188544 | * | 7/1989 | C08L 25/04 |
| JP | 5-170999 | * | 7/1993 | C08L 51/00 |
| JP | 2659467 B2 | | 9/1997 | |
| JP | 2688619 B2 | | 12/1997 | |
| JP | 2798396 B2 | | 9/1998 | |
| JP | 10-316833 A | | 12/1998 | |
| JP | 2000-119477 | * | 4/2000 | C08L 51/04 |
| JP | 2001-131368 A | * | 5/2001 | C08L 25/02 |
| JP | 2002-265772 A | | 9/2002 | |
| JP | 2003-261760 A | | 9/2003 | |
| JP | 2010-158961 A | * | 7/2010 | B60K 37/04 |
| JP | 2011-137066 A | | 7/2011 | |
| JP | 2011-137067 A | | 7/2011 | |
| JP | 2011-162592 A | | 8/2011 | |
| WO | WO 2010/117020 A1 | * | 10/2010 | C08L 51/00 |

OTHER PUBLICATIONS

Ito et al. (JP 2001-131368 A); May 15, 2001; machine translation in English.*

Hiroshi Matsukawa: "Physics of Friction", Journal of the Surface Science of Japan, vol. 24, No. 6, pp. 328-333, Apr. 15, 2003.

* cited by examiner

THERMOPLASTIC RESIN COMPOSITION FOR REDUCTION OF SQUEAKING NOISES AND STRUCTURE OF REDUCED SQUEAKING NOISES

TECHNICAL FIELD

The present invention relates to a thermoplastic resin composition for reduction of squeaking noises and a structure of reduced squeaking noises made of the thermoplastic resin, and more particularly, to a thermoplastic resin composition for reduction of squeaking noises which is remarkably capable of reducing squeaking noises caused by coming into contact with and rubbing at least two parts, and a structure of reduced squeaking noise made of the thermoplastic resin.

BACKGROUND ART

Styrene resins represented by ABS resin are widely used for the production of automobiles, household electrical appliances, OA equipments or the like due to its superior moldability, mechanical properties, chemical resistance and secondary processability.

However, when parts of styrene resins represented by ABS resin come into contact with and rub against another part made of other resins such as polyethylene and polyvinyl chloride or another part such as a lining sheet or a foam made of chloroprene rubber, natural rubber, polyester or polyethylene, squeaking noises (rubbing noises) may be generated. For example, in a ventilator made of ABS resin is installed a valve shutter using a chloroprene rubber foam or the like as a sealing material in order to adjust an air quantity. If the valve shutter is rotated for air quantity adjustment, a case of the ventilator rubs against the sealing material, so that squeaking noises may be generated.

Moreover, it is known that when parts made of styrene resins rub against each other, squeaking noises tend to be generated. Therefore, it is avoided to use parts made of styrene resins in combination in places where the parts come into contact with and rub against each other, for example, by vibration, rotation or the like.

Since the styrene resins such as ABS resin and ASA resin are amorphous resins, they are higher in coefficient of friction as compared with crystalline resins such as polyethylene, polypropylene and polyacetal, and it is well known that, like an air outlet of an air conditioner in an automobile or buttons of a car audio system, when fitting with a member made of another resin, a stick slip phenomenon as illustrated in FIG. 1 occurs to generate unpleasant sounds (squeaking noises) because of a large coefficient of friction. The stick slip phenomenon is a phenomenon that is generated when two objects rub against each other. As illustrated by a model of FIG. 2(*a*), when an object M connected with a spring is placed on a driving table that moves at a driving speed V, the object M moves toward the right direction first as illustrated in FIG. 2(*b*) together with the table moving at the driving speed V by the action of a static frictional force. When the force by which the object M is to be restored to its original position becomes equal to the static frictional force, the object M starts to slip in the opposite direction to the driving speed V. At this time, the object M comes to receive a kinematic frictional force, and the slip is stopped when the force of the spring becomes equal to the kinematic frictional force as illustrated in FIG. 2(*c*), so that the object M comes again into a state where it attaches on the driving table and it moves again in the same direction as the driving speed V (FIG. 2(*d*)). This is called a stick slip phenomenon. As illustrated in FIG. 1, it has been said that if the difference $\Delta\mu$ between the coefficient of static friction $\mu s$ of the upper end of a saw wavy form and the coefficient of friction $\mu 1$ of the lower end of a saw wavy form is large, squeaking noises tend to be generated easily. A dynamic friction coefficient is a middle value between $\mu s$ and $\mu l$.

When those are used as automobile interior parts and the like, such a squeaking noise is a major cause that spoils comfortableness and silence when riding a car, and therefore reduction of squeaking noises is demanded strongly.

On the other hand, it is known that the stick slip phenomenon occurs remarkably when the friction velocity dependency of a coefficient of friction determined on the basis of the Amonton-Coulomb's law takes a negative value (see non-patent document 1), and it is possible to inhibit the occurrence of the stick slip phenomenon and reduce the generation of squeaking noises by bringing the friction velocity dependency of the coefficient of friction close to zero or to a positive value greater than zero.

In order to prevent such squeaking noises, a method of applying Teflon (registered trademark) coating to the surface of a member, a method of mounting a Teflon (registered trademark) tape, a method of applying a silicone oil, etc. have been performed. However, the step of mounting or applying is very complicated and requires time and effort, and there is a problem that the effect does not continue when being placed under high temperatures for a long time.

As a method for changing the properties of the material itself, a method of incorporating a silicone oil into an ABS resin and a method of incorporating an epoxy-containing olefin copolymer into an ABS resin have been proposed. For example, there have been disclosed a technology of incorporating an organosilicon compound into a resin composed of a polycarbonate resin and an ABS resin (see patent document 1), a technology of incorporating a flame retardant, a flame retarding aid and a silicone oil into an ABS resin (see patent document 2), a technology of incorporating a silicone oil into a rubber-modified polystyrene resin (see patent document 3), a technology of incorporating an alkali (earth) metal salt of an alkane sulfonate surfactant into an ABS resin (see patent document 4), and a technology of incorporating a modified polyorganosiloxane having at least one reactive group selected from among an epoxy group, a carboxyl group and an acid anhydride group into an ABS resin (see patent document 5).

However, an effect of reducing squeaking noises obtained by these methods is not sufficient. Even if the effect of preventing squeaking noises is considerably exhibited just after molding, the durability of the effect is poor, and in particular, there is a problem that the effect deteriorates remarkably when being placed under high temperatures for a long time.

Moreover, when the parts made of styrene resins represented by ABS resins are assembled in combination, even with those technologies, the sufficient effect of reducing squeaking noises cannot be obtained and thus there was a problem that the range of usage was limited.

PRIOR ART DOCUMENTS

Patent Documents

Patent document 1: Japanese Examined Publication 63 (1988)-56267
Patent document 2: Japanese Patent No. 2798396
Patent document 3: Japanese Patent No. 2688619
Patent document 4: Japanese Patent No. 2659467

Patent document 5: Japanese Laid-open Publication 10 (1998)-316833

Non-Patent Documents

Non-patent document 1: Journal of The Surface Science of Japan, Vol. 24, No. 6, PP. 328-333, 2003

SUMMARY OF THE INVENTION

Problem to be Solved by the Invention

In view of such situations, an object of the present invention is to provide a thermoplastic resin composition which is capable of providing a structure of reduced squeaking noises, even when the parts of styrene resins are used in places where those rub against each other, characterized in that generation of squeaking noises that are generated when members rub against each other is remarkably reduced, that an effect of reducing squeaking noises is maintained without deterioration even when being placed under high temperatures for a long time, and that excellent impact resistance and molded appearance are imparted.

Solutions to the Problems

Meanwhile, silicone oil is blended in a resin composition for the purpose of modifying, for example, increase in slidability of a molded article. Moreover, it may be added to prevent deterioration and discoloration of a rubber-reinforced vinyl resin caused by raised temperature of the resin due to shear force in an extruder when the rubber-reinforced vinyl resin is melted and kneaded or volatile substances are removed in the extruder. Further, it may also be added in a step of polymerizing rubber polymer for the same purposes as aforesaid.

The present inventors have made an extensive series of studies in order to solve the above-described problems and, as a result, they found that by controlling an amount of silicon to a specific level contained in a thermoplastic resin composition [X] containing a specific rubber-reinforced vinyl resin, even when parts made of the above-mentioned component [X] rub against each other, generation of squeaking noises is remarkably reduced, an effect of reducing squeaking noises is maintained without deterioration even when being placed under high temperatures for a long time, and those are superior in impact resistance and molded appearance. The present invention has been completed on this finding.

According to the present invention, the following thermoplastic resin composition for reduction of squeaking noises and a structure of reduced squeaking noises are provided.

1. A thermoplastic resin composition [X] for reduction of squeaking noises containing a rubber-reinforced vinyl resin [A] obtained by polymerizing a vinyl monomer [b1] in the presence of an ethylene-α-olefin rubber polymer [a1] having Tm (melting point) of 0° C. or higher, wherein an amount of silicon contained in the thermoplastic resin composition [X] is 0.15% by mass or less based on 100% by mass of the thermoplastic resin composition [X].

2. The thermoplastic resin composition for reduction of squeaking noises of the above-mentioned 1, wherein an amount of the ethylene-α-olefin rubber polymer [a1] is 5 to 30% by mass based on 100% by mass of the thermoplastic resin composition [X].

3. The thermoplastic resin composition for reduction of squeaking noises of the above-mentioned 1 or 2, wherein the rubber-reinforced vinyl resin [A] contains the rubber-reinforced vinyl resin [A1] obtained by polymerizing the vinyl monomer [b1] in the presence of the ethylene-α-olefin rubber polymer [a1] having Tm (melting point) of 0° C. or higher, and a (co)polymer [B] of a vinyl monomer [b2].

4. The thermoplastic resin composition for reduction of squeaking noises of the above-mentioned 1 to 3, wherein the ethylene α-olefin rubber polymer [a1] comprises 5 to 95% by mass of ethylene and 95 to 5% by mass of an α-olefin (provided that the total amount of the ethylene and the α-olefin is 100% by mass).

5. The thermoplastic resin composition for reduction of squeaking noises of the above-mentioned 1 to 4, wherein a graft ratio of the rubber-reinforced vinyl resin [A] is in a range of from 10 to 150% by mass, and an intrinsic viscosity [η] (measured at 30° C. in methyl ethyl ketone) of an acetone-soluble fraction is in a range of from 0.1 to 1.5 dl/g.

6. The thermoplastic resin composition for reduction of squeaking noises of the above-mentioned 1 to 5, wherein an intrinsic viscosity [η] (measured at 30° C. in methyl ethyl ketone) of an acetone-soluble fraction of the thermoplastic resin composition [X] is in a range of from 0.1 to 1.5 dl/g.

7. The thermoplastic resin composition for reduction of squeaking noises of the above-mentioned 1 to 6, wherein the ethylene-α-olefin rubber polymer [a1] is an ethylene-propylene copolymer.

8. The thermoplastic resin composition for reduction of squeaking noises of the above-mentioned 1 to 7, the amount of silicon contained in the thermoplastic resin composition [X] is 0.1% by mass or less based on 100% by mass of the thermoplastic resin composition [X].

9. The thermoplastic resin composition for reduction of squeaking noises of the above-mentioned 1 to 7, the amount of silicon contained in the thermoplastic resin composition [X] is 0.07% by mass or less based on 100% by mass of the thermoplastic resin composition [X].

10. The thermoplastic resin composition for reduction of squeaking noises of the above-mentioned 1 to 7, the amount of silicon contained in the thermoplastic resin composition [X] is 0.03% by mass or less based on 100% by mass of the thermoplastic resin composition [X].

11. A structure of reduced squeaking noises which comprises at least two contacting parts, said contacting parts including a contacting part made of the thermoplastic resin composition [X] defined in the above-mentioned 1 to 10.

12. The structure of reduced squeaking noises of the above-mentioned 11, wherein two or more of the contacting parts are made of the thermoplastic resin composition [X] defined in the above-mentioned 1 to 10.

13. The structure of reduced squeaking noises of the above-mentioned 12, wherein a noise risk measured by a stick-slip measuring instrument SSP-02 manufactured by Zigler-Instruments GmbH is 3 or less under measuring conditions as set forth below:
Measuring Conditions
Loads: 5N, 40N
Speeds: 1 mm/sec, 10 mm/sec 14. The structure of reduced squeaking noises of the above-mentioned 11 to 13, wherein the contacting parts are for automobile interior parts, switch parts, business equipment parts, household electrical appliance parts, desk rock parts, housing interior parts or open-close damper parts of inside doors.

15. A meter visor for automobile interior parts which includes a contacting part made of the thermoplastic resin composition [X] defined in the above-mentioned 1 to 10.

16. A center panel for automobile interior parts which includes a contacting part made of the thermoplastic resin composition [X] defined in the above-mentioned 1 to 10.

17. A console box for automobile interior parts which includes a contacting part made of the thermoplastic resin composition [X] defined in the above-mentioned 1 to 10.

18. A switch bezel for automobile interior parts which includes a contacting part made of the thermoplastic resin composition [X] defined in the above-mentioned 1 to 10.

Advantageous Effects of the Invention

According to the present invention, controlling of an amount of silicon to a specific level contained in a thermoplastic resin composition [X] containing a specific rubber-modified vinyl resin makes it possible to obtain a structure of reduced squeaking noises, which reduces remarkably squeaking noises when parts made of the above-mentioned component [X] rub against each other, which does not deteriorate the effect of reducing squeaking noises even when being placed at high temperatures for a long time, and which is excellent in impact resistance and molded appearance.

EMBODIMENTS OF THE INVENTION

Figure 1:
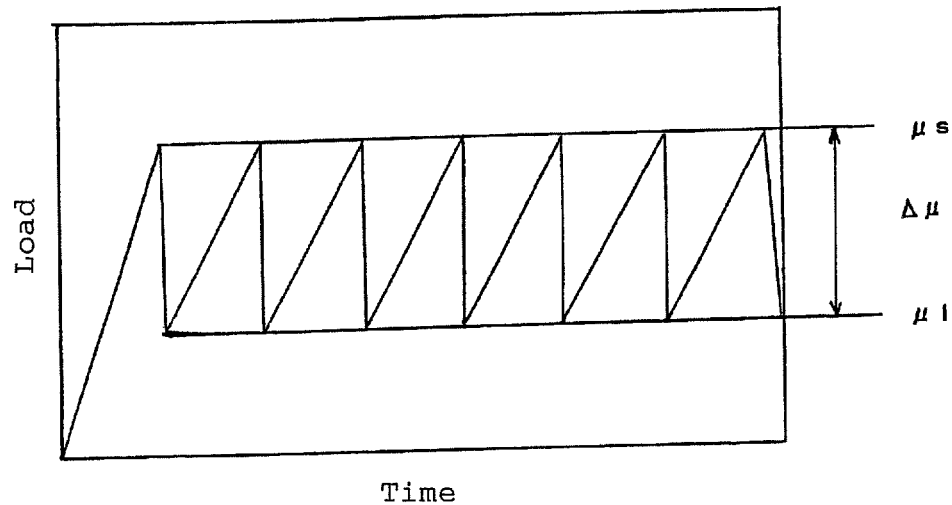
FIG. 1 is an explanatory diagram of a stick slip phenomenon.
Figure 2:
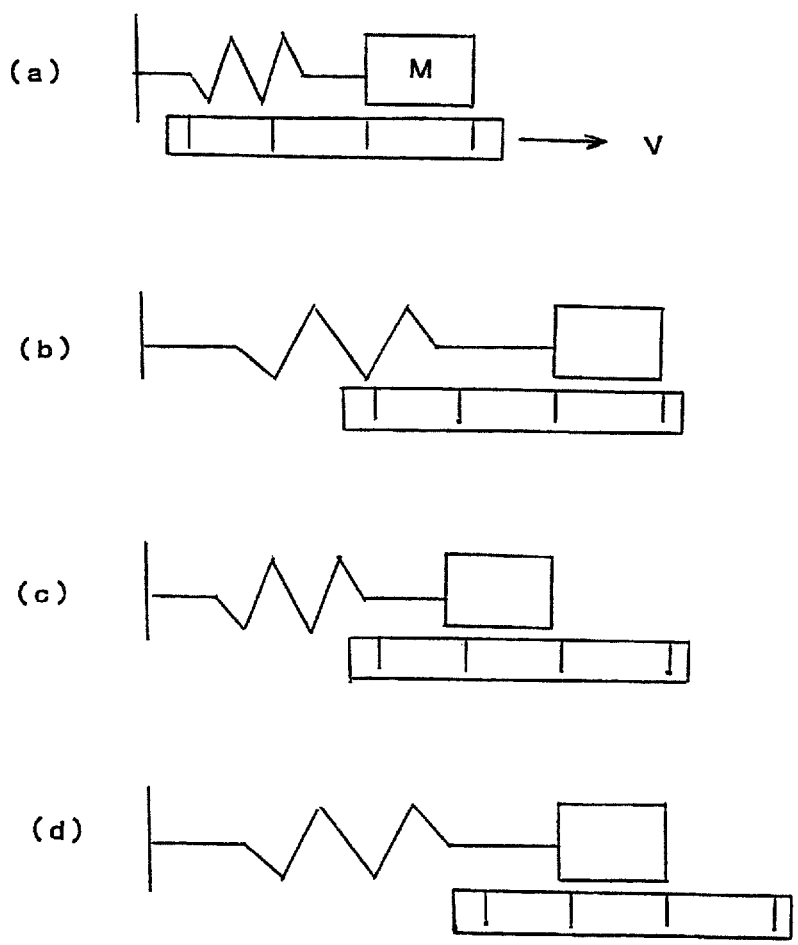
FIG. 2(a), (b), (c) and (d) are model diagrams of a stick slip.

The present invention will be described in more detail below.

The thermoplastic resin composition [X] for reduction of squeaking noises contains a rubber-reinforced vinyl resin [A] obtained by polymerizing a vinyl monomer [b1] in the presence of an ethylene-α-olefin rubber polymer [a1] having Tm (melting point) of 0° C. or higher, wherein an amount of silicon contained in the thermoplastic resin composition [X] is 0.15% by mass or less based on 100% by mass of the thermoplastic resin composition [X].

Meanwhile, in the present specification, "(co)polymerization" means homopolymerization and copolymerization, "(meth)acrylic" means acrylic and/or methacrylic, and "(meth)acrylate" means acrylate and/or methacrylate.

1. Rubber-Reinforced Vinyl Resin [A] (Hereinafter Referred to Also as "Component [A]"):

Component [A] used in the present invention is a rubber-reinforced vinyl resin [A1] singly, obtained by polymerizing a vinyl monomer [b1] in the presence of an ethylene-α-olefin rubber polymer [a1] having Tm (melting point) of 0° C. or higher, and/or, a mixture of [A1] and a (co)polymer [B] of a vinyl monomer [b2]. The (co)polymer [B] is obtained by polymerizing a vinyl monomer [b2] in the absence of a rubber polymer.

1-1. Ethylene-α-Olefin Rubber Polymer [a1] (Hereinafter Referred to Also as "Component [a1]):

The ethylene-α-olefin rubber polymer [a1] used in the present invention is not specifically limited if Tm (melting point) is 0° C. or higher.

Here, Tm is measured by DSC (differential scanning calorimetry) in which an endothermic change is measured at a constant heating rate of 20° C./minute and a peak temperature of the obtained endothermic pattern is read. The particulars are described in JIS K7121-1987. The Tm is preferably 0 to 120° C., more preferably 10 to 100° C., particularly preferably 20 to 80° C. In cases where the Tm is less than 0° C., the reduction effect of squeaking noises lowers since the rubber polymer does not have crystallizability around room temperature where the parts are often used. Meanwhile, when the peak of endothermic change in the DSC measurement is not exhibited clearly, the rubber polymer does not have crystallizability substantially. Accordingly, it is judged as having no Tm and it is not included in the rubber polymer having Tm of 0° C. or higher. Consequently, the rubber polymer having no Tm is also poor in reduction effect of squeaking noises.

The presence of melting point (Tm) in the rubber polymer indicates that it has a crystalline part. The presence of a crystalline part in the rubber polymer, as mentioned above, suppresses occurrence of a stick slip phenomenon, and as a result, generation of squeaking noises is presumably suppressed.

Further, glass transition temperature (Tg) of the rubber polymer is preferably −20° C. or lower, more preferably −30° C. or lower, particularly preferably −40° C. or lower. In cases where the glass transition temperature exceeds −20° C., impact resistance tends to be insufficient. Meanwhile, the glass transition temperature can be obtained in the same manner as in Tm (melting point), using DSC (differential scanning calorimetry) according to JIS K7121-1987.

Examples of the α-olefin constituting the above-mentioned component [a1] include α-olefins having 3 to 20 carbon atoms, and specifically include propylene, 1-butene, 1-pentene, 1-hexene, 4-methyl-1-pentene, 1-heptene, 1-octene, 1-decene, 1-dodecene, 1-hexadecene and 1-eicosene. These α-olefins may be used singly or in combination of two or more. The number of carbon atoms of the α-olefin is preferably 3 to 20, more preferably 3 to 12, and even more preferably 3 to 8. If the number of carbon atoms exceeds 20, the surface appearance of a molded article may become insufficient due to deterioration in copolymerizability. The mass ratio of ethylene:α-olefin is usually 5 to 95:95 to 5, preferably 50 to 95:50 to 5, and more preferably 60 to 95:40 to 5, particularly preferable 70 to 90:30 to 10.

If the mass ratio of the α-olefin exceeds 95, impact strength of the obtained rubber-reinforced vinyl resin is insufficient, and if it is less than 5, sufficient impact resistance of the resin composition may not be provided because the rubber elasticity of the rubber polymer [a1] becomes insufficient.

The Mooney viscosity ($ML_{1+4}$, at 100° C.; in accordance with JIS K6300) of the component [a1] is usually 5 to 80, preferably 10 to 65, and more preferably 10 to 45. If the Mooney viscosity exceeds 80, the fluidity of an obtained rubber-reinforced vinyl resin may become insufficient, and if the Mooney viscosity becomes less than 5, the impact resistance of an obtained molded article may become insufficient.

As the above-mentioned ethylene-α-olefin rubber polymer [a1], those not containing nonconjugated diene components are usually used in terms of reduction of squeaking noises. As the nonconjugated diene components, 5-ethylidene-2-norbornene, dicyclopentadiene or the like are exemplified. When the above-mentioned component [a1] contains the nonconjugated diene components, the amount blended is preferably 3% by mass or less based on 100% by mass of ethylene and α-olefin. If the amount blended of the nonconjugated components is more than 3% by mass, the crystallizability of rubbers lowers and the effect of reducing squeaking noises tends to be insufficient. As the above-mentioned component [a1], an ethylene-propylene copolymer, an ethylene-1-butene copolymer and an ethylene-1-octene copolymer are more preferable, and the ethylene-propylene copolymer is particularly preferable.

1-2. Vinyl Monomers [b1] to [b2]:

The vinyl monomers [b1] and [b2] each may, without any particular limitations, be any polymerizable compound having an unsaturated bond.

The vinyl monomers [b1] and [b2] each usually include an aromatic vinyl compound and a vinyl cyanide compound. If necessary, other copolymerizable vinyl monomers such as (meth)acrylic acid ester and maleimide compounds, functional group-containing vinyl monomers having one or more functional groups such as a carboxyl group, an acid anhydride group, a hydroxyl group, an amino group, an amide group, an epoxy group and an oxazoline group may be used in combination.

The vinyl monomer [b2] to be used for forming the (co) polymer [B] may be either the same as or different from the vinyl monomer [b1].

As the above-mentioned aromatic vinyl compound, any compound having at least one vinyl bond and at least one aromatic ring can be used without any particular limitations. Examples thereof include styrene, α-methylstyrene, o-methylstyrene, p-methylstyrene, vinyltoluene, β-methylstyrene, ethylstyrene, p-tert-butylstyrene, vinylxylene, vinylnaphthalene, monochlorostyrene, dichlorostyrene, monobromostyrene, dibromostyrene and fluorostyrene. These may be used singly or in combination of two or more. Among these, styrene and α-methylstyrene are preferred.

Examples of the above-mentioned vinyl cyanide compound include acrylonitrile and methacrylonitrile. These may be used singly or in combination of two or more. Among these, acrylonitrile is preferred.

Examples of the above-mentioned (meth)acrylic acid ester include acrylic acid esters such as methyl acrylate, ethyl acrylate, propyl acrylate, butyl acrylate, amyl acrylate, hexyl acrylate, octyl acrylate, 2-ethylhexyl acrylate, cyclohexyl acrylate, phenyl acrylate and benzyl acrylate; and methacrylic acid esters such as methyl methacrylate, ethyl methacrylate, propyl methacrylate, butyl methacrylate, amyl methacrylate, hexyl methacrylate, octyl methacrylate, 2-ethylhexyl methacrylate, dodecyl methacrylate, octadecyl methacrylate, cyclohexyl methacrylate, phenyl methacrylate and benzyl methacrylate. These may be used singly or in combination of two or more. Among these, methyl methacrylate is preferred.

Examples of the above-mentioned maleimide compound include maleimide, N-methylmaleimide, N-butylmaleimide, N-cyclohexylmaleimide, and N-phenylmaleimide. These may be used singly or in combination of two or more. Among these, N-cyclohexylmaleimide and N-phenylmaleimide are preferred.

Meanwhile, as a method for introducing a monomer unit composed of the maleimide compound into a polymer, there is a method in which maleic anhydride is copolymerized beforehand and then imidation is conducted.

Among the above-mentioned functional group-containing vinyl monomers, examples of unsaturated compounds having a carboxyl group include acrylic acid, methacrylic acid, ethacrylic acid, maleic acid, fumaric acid, itaconic acid, crotonic acid and cinnamic acid. These may be used singly or in combination of two more.

Examples of the unsaturated compound having an acid anhydride group include maleic anhydride, itaconic anhydride and citraconic anhydride. These may be used singly or in combination of two or more.

Examples of the unsaturated compound having a hydroxyl group include hydroxystyrene, 3-hydroxy-1-propene, 4-hydroxy-1-butene, cis-4-hydroxy-2-butene, trans-4-hydroxy-2-butene, 3-hydroxy-2-methyl-1-propene, 2-hydroxyethyl acrylate, 2-hydroxyethyl methacrylate and N-(4-hydroxyphenyl)maleimide. These may be used singly or in combination of two or more.

Examples of the unsaturated compound having an amino group include aminoethyl acrylate, propylaminoethyl acrylate, dimethylaminomethyl acrylate, diethylaminomethyl acrylate, 2-dimethylaminoethyl acrylate, aminoethyl methacrylate, propylaminoethyl methacrylate, dimethylaminomethyl methacrylate, diethylaminomethyl methacrylate, 2-dimethylaminoethyl methacrylate, phenylaminoethyl methacrylate, p-aminostyrene, N-vinyldiethylamine, N-acetylvinylamine, acrylic amine, methacrylic amine and N-methylacrylic amine. These may be used singly or in combination of two or more.

Examples of the unsaturated compound having an amide group include acrylamide, N-methylacrylamide, methacrylamide and N-methylmethacrylamide. These may be used singly or in combination of two or more.

Examples of the unsaturated compound having an epoxy group include glycidyl acrylate, glycidyl methacrylate and allyl glycidyl ether. These may be used singly or in combination of two or more.

Examples of the unsaturated compound having an oxazoline group include vinyl oxazoline. These may be used singly or in combination of two or more.

While the types and the used amounts of the vinyl monomers [b1] and [b2] are chosen according to the purpose, application, and so on, the total amount of the aromatic vinyl compound and the vinyl cyanide compound is usually 30 to 100% by mass, preferably 50 to 100% by mass, and more preferably 70 to 100% by mass based on 100% by mass of the whole portion of the vinyl monomers. The amount of the aforementioned other copolymerizable vinyl monomer is usually 0 to 70% by mass, preferably 0 to 50% by mass, and more preferably 0 to 30% by mass based on 100% by mass of the whole portion of the vinyl monomers. The amount of the aforementioned functional group-containing vinyl monomer is usually 0 to 40% by mass, preferably 0 to 30% by mass, and more preferably 0 to 20% by mass based on 100% by mass of the whole portion of the vinyl monomers. The use ratio of the aromatic vinyl compound and the vinyl cyanide compound (aromatic vinyl compound/vinyl cyanide compound) is usually 40 to 85% by mass/15 to 60% by mass, and preferably 45 to 85% by mass/15 to 55% by mass, particularly preferably 60 to 85% by mass/15 to 40% by mass, provided that the total amount of these compounds is taken as 100% by mass.

1-3. Method for Producing of the Rubber-Reinforced Vinyl Resin [A]:

While the aforementioned rubber-reinforced vinyl resin [A] is a polymer component containing an ethylene-α-olefin rubber polymer [a1], their contained mode is not particularly restricted.

The rubber-reinforced vinyl resin [A] usually contains a graft copolymer in which a (co)polymer of a vinyl monomer has been grafted to a rubber polymer and a (co)polymer of a vinyl monomer not having grafted to a rubber polymer. It is noted that the graft copolymer may contain a rubber polymer to which no (co)polymer of a vinyl monomer has been grafted.

Moreover, examples of the contained mode of the ethylene-α-olefin rubber polymer [a1] are provided below:

(1) A case in which the ethylene-α-olefin rubber polymer [a1] is contained in the form of graft copolymers.

(2) A case in which the ethylene-α-olefin rubber polymer [a1] is contained in the form of non-graft copolymers.

Among these, (1) is preferred.

Examples of the rubber-reinforced vinyl resin [A] of the above-mentioned mode (1) are provided below:

[i] A rubber-reinforced vinyl resin [A1] obtained by polymerizing a vinyl monomer [b1] in the presence of the ethylene-α-olefin rubber polymer [a1].

[ii] A mixture composed of the above-mentioned [i] and a (co)polymer [B] of a vinyl monomer [b2] (hereinafter referred to also as "(co)polymer [B]").

Among these, [ii] is particularly preferred since it is possible to adjust the amount of the ethylene-α-olefin rubber polymer [a1] contained in the rubber-reinforced vinyl polymer [A].

The rubber-reinforced vinyl resin [A] may be a combination of the above [i] and [ii].

Next, the method for producing of the rubber-reinforced vinyl resin [A1] will be described.

Examples of the polymerization method include conventional polymerization methods such as emulsion polymerization, solution polymerization, suspension polymerization and bulk polymerization. In any of these methods, it is permissible to feed a vinyl monomer at one time and make it react in the presence of a rubber polymer, and it is also permissible to add a vinyl monomer dividedly or continuously and make it react. Regarding the rubber polymer, the whole amount or a part of it may be added during the polymerization with the vinyl monomer and made to react.

The amount of the rubber polymer used is usually 5 to 80% by mass, and preferably 10 to 70% by mass, provided that the total of the rubber polymer and the vinyl monomer is taken as 100% by mass.

The method for producing of the above-mentioned rubber-reinforced vinyl resin [A1] is preferably solution polymerization and bulk polymerization, and solution polymerization is more preferred. Those may also be used in combination.

When producing the rubber-reinforced vinyl resins [A1] by emulsion polymerization, a polymerization initiator, a chain transfer agent, an emulsifier, water, and so on are usually used. When the rubber polymer is not in a latex form but in a solid form, it can be used after being converted into a latex form by reemulsification.

Examples of the polymerization initiator include redox polymerization initiators composed of organic peroxides such as cumene hydroperoxide, diisopropylbenzene hydroperoxide and paramenthane hydroperoxide, and reducing agents represented by saccharated pyrophosphoric acid formulation and sulfoxilate formulation; persulfates such as potassium persulfate; peroxides such as benzoyl peroxide (BPO), lauroyl peroxide, tert-butyl peroxylaurate and tert-butyl peroxymonocarbonate; and azo polymerization initiators such as 2,2'-azobis(isobutyronitrile). These may be used singly or in combination of two or more. The amount of the polymerization initiator to be used is usually 0.05 to 5% by mass, and preferably 0.1 to 1% by mass based on the total amount of the vinyl monomer [b1].

The polymerization initiator is usually added to a reaction system at one time or continuously.

Examples of the chain transfer agent include mercaptans such as octylmercaptan, n-dodecylmercaptan, tert-dodecylmercaptan, n-hexylmercaptan, n-hexadecylmercaptan, n-tetradecylmercaptan and tert-tetradecylmercaptan; terpinolenes, a dimer of α-methylstyrene, tetraethylthiuram sulfide, acrolein, methacrolein, allyl alcohol and 2-ethylhexyl thioglycol. These may be used singly or in combination of two or more. The amount of the chain transfer agent to be used is usually 0.05 to 2% by mass based on the total amount of the vinyl monomer [b1].

The emulsifier includes anionic surfactants and nonionic surfactants. Examples of the anionic surfactants include sulfate of higher alcohols; salts of alkylbenzene sulfonic acids such as sodium dodecylbenzenesulfonate; salts of aliphatic sulfonic acids such as sodium laurylsulfate; salts of rosin acids, and salts of phosphoric acid. Examples of the nonionic surfactants include alkyl ester type compounds of polyethylene glycol and alkyl ether type compounds of polyethylene glycol. These may be used singly or in combination of two or more. The amount of the emulsifier to be used is usually 0.3 to 5% by mass based on the whole amount of the vinyl monomer [b1].

Emulsion polymerization can be carried out under conventional conditions according to the types and the amounts of the vinyl monomer [b1], a polymerization initiator, and so on to be used. The latex obtained by the emulsion polymerization is usually coagulated using a coagulant, the polymer component is formed into a powdery form, which is then purified by washing with water and drying. As the coagulant, inorganic salts such as calcium chloride, magnesium sulfate, magnesium chloride and sodium chloride; inorganic acids such as sulfuric acid and hydrochloric acid; and organic acids such as acetic acid, lactic acid and citric acid, and so on are used. These may be used singly or in combination of two or more. According to the performance required, it is also permissible to do washing after performing neutralization treatment by the addition of an alkali component or an acid component after the coagulation.

When producing the rubber-reinforced vinyl resin [A1] by solution polymerization, a solvent, a polymerization initiator, a chain transfer agent, and so on are usually used.

As the solvent, inert polymerization solvents to be used for conventional radical polymerization can be used; for example, aromatic hydrocarbons such as ethylbenzene and toluene; ketones such as methyl ethyl ketone and acetone; halogenated hydrocarbons such as dichloromethylene and carbon tetrachloride; acetonitrile, dimethylformamide, and N-methylpyrrolidone can be used. These may be used singly or in combination of two or more.

Examples of the polymerization initiator include organic peroxides such as ketone peroxides, dialkyl peroxides, diacyl peroxides, peroxyesters and hydroperoxides. These may be used singly or in combination of two or more.

Examples of the chain transfer agent include mercaptans, terpinolenes and a dimer of α-methylstyrene. These may be used singly or in combination of two or more.

Solution polymerization can be carried out under conventional conditions according to the types and the amounts of the vinyl monomer [b1], a polymerization initiator, and so on to be used. The polymerization temperature is usually within the range of 80 to 140° C. The production can also be performed without using any polymerization initiator in the solution polymerization.

Also in the cases of bulk polymerization and suspension polymerization, conventional methods can be applied. As a polymerization initiator, a chain transfer agent, and the like to be used for such methods, there is no particular limitation and the compounds exemplified in the description of the solution polymerization can be used.

1-5. Physical Property of Rubber-Reinforced Vinyl Resin [A]:

The graft ratios of the rubber-reinforced vinyl resin [A1] obtained in the above-described manners are each usually 10 to 150% by mass, preferably 20 to 120% by mass, and particularly preferably 30 to 70% by mass. If the graft ratio is less than 10% by mass, impact resistance may be insufficient because a density of the (co) polymer of the vinyl monomer

[b1] grafted to the rubber polymer becomes low or the length of the graft chain becomes short. On the other hand, if the graft ratio exceeds 150% by mass, since a layer of the (co)polymer of the vinyl monomer [b1] on the surface of the rubber polymer becomes thick and further a layer of the (co)polymer grafted inside the rubber polymer develops, rubber elasticity decreases and, as a result, impact resistance may deteriorate.

The above-mentioned graft ratio can be calculated by the following formula.

Graft ratio (% by mass)=$\{(S-T)/T\} \times 100$

In the above formula, S is a mass (g) of an insoluble fraction obtained by charging 1 gram of a rubber-reinforced vinyl resin into 20 ml of acetone then shaking the mixture for 2 hours with a shaker under a temperature condition of 25° C., and then centrifuging the mixture for 60 minutes with a centrifugal separator (rotation speed; 23,000 rpm) under a temperature condition of 5° C., thereby separating the insoluble fraction and the soluble fraction, and T is a mass (g) of the rubber polymer contained in 1 g of the rubber-reinforced vinyl resin. The mass of the rubber polymer can be determined by a method of calculating it from a polymerization formulation and a polymerization conversion, a method of determining it from an infrared absorption spectrum (IR), and so on.

The intrinsic viscosity $[\eta]$ (measured at 30° C. in methyl ethyl ketone) of the acetone-soluble fraction of each of the rubber-reinforced vinyl resins [A1] is usually 0.1 to 1.5 dl/g, and preferably 0.2 to 0.8 dl/g. When the intrinsic viscosity $[\eta]$ is within the above range, a physical property balance between moldability and impact resistance is excellent.

The measurement of the intrinsic viscosity $[\eta]$ was performed by the following method. First, the acetone-soluble fraction (if the rubber polymer is an acrylic rubber, acetonitrile is used in place of acetone) of each of the rubber-reinforced vinyl resin [A1] was dissolved in methyl ethyl ketone, so that five solutions differing in concentration were prepared. A reduced viscosity was measured using a Ubbelohde viscosity tube at each concentration at 30° C., and from the measurements an intrinsic viscosity $[\eta]$ was determined. The unit is dl/g.

The intrinsic viscosity can be adjusted by appropriately choosing the type and the amount of the chain transfer agent to be used in production, the type and the amount of the polymerization initiator to be used, the polymerization temperature, and so on.

2. (Co)Polymer [B] (Hereinafter Referred to Also as "Component [B]"):

2-1. Method for Producing a (Co)Polymer [B]:

The (co)polymer [B] can be produced by polymerizing a vinyl monomer [b2] in the absence of a rubber polymer by a conventional method such as solution polymerization, bulk polymerization, emulsion polymerization and suspension polymerization. Such polymerization may be either thermal polymerization using no polymerization initiator or catalytic polymerization using a polymerization initiator.

2-2. Physical Properties of a (Co)Polymer [B]:

The intrinsic viscosity $[\eta]$ (measured at 30° C. in methyl ethyl ketone) of the polymer [B] is usually 0.1 to 1.5 dl/g, and preferably 0.2 to 1.0 dl/g. When the intrinsic viscosity is within the above range, a physical property balance between moldability and impact resistance is excellent.

The measurement of the intrinsic viscosity $[\eta]$ was performed by the following method. First, the (co)polymer [B] was dissolved in methyl ethyl ketone, so that five solutions differing in concentration were prepared. A reduced viscosity was measured using a Ubbelohde viscosity tube at each concentration at 30° C., and from the measurements an intrinsic viscosity was determined. The unit is dl/g.

The intrinsic viscosity can be adjusted by appropriately choosing the type and the amount of the chain transfer agent to be used in production, the type and the amount of the polymerization initiator to be used, the polymerization temperature, and so on.

3. Silicone Oil [C] (Hereinafter Referred to Also as "Component [C]"):

The silicone oil as the component [C] used in the present invention is used to prevent deterioration and discoloration of a rubber-reinforced vinyl resin caused by raised temperature of the resin due to shear force in an extruder when the rubber-reinforced vinyl resin is melted and kneaded or when volatile substances are removed in the extruder, and well-known silicone oils can be used as far as they have a polyorganosiloxane structure. The silicone oil [C] may be either an unmodified silicone oil such as dimethyl silicone oil, methylphenyl silicone oil and methyl hydrogen silicone oil, or a modified silicone oil in which various types of organic groups have been introduced to a part of a side chain in a polyorganosiloxane structure and/or one terminal portion of a polyorganosiloxane structure, or both terminal portions of a polyorganosiloxane structure. As the modified silicone oil, alkyl-modified silicone oil, alkyl-aralkyl-modified silicone oil, polyether-modified silicone oil, fluorine-modified silicone oil, higher alkoxy-modified silicone oil, higher fatty acid-modified silicone oil, methylstyryl-modified silicone oil, methyl chlorinated phenyl silicone oil, methyl hydrogen silicone oil, amino-modified silicone oil, epoxy-modified silicone oil, carboxyl-modified silicone oil, acrylic-modified silicone oil, methacrylic-modified silicone oil, mercapto-modified silicone oil, phenol-modified silicone oil, carbinol-modified silicone oil, and the like can be used. These may be used singly or in combination of two or more.

The amount of the silicone oil [C] is 0.15% by mass or less in terms of silicon contained in the thermoplastic resin composition [X] based on 100% by mass of the thermoplastic resin composition, preferably 0.1% by mass or less, more preferably 0.07% by mass or less, still more preferably 0.03% by mass or less. If the amount of silicon contained in the thermoplastic resin composition [X] exceeds 0.15% by mass, squeaking noise are not only generated when the materials of the same kinds are used in combination, but silver streaks occur in the neighborhood of a gate to thus deteriorate molded appearance.

The amount of silicon contained in the thermoplastic resin composition [X] was measured by a fluorescent X-ray analytical instrument "MagicX PRO" manufactured by PANalytial.

4. Thermoplastic Resin Composition [X]:

The thermoplastic resin composition [X] in the present invention is obtained by mixing the above-mentioned component [A] and, if necessary, the above-mentioned component [B], in a prescribed incorporating proportion, and melt-kneading them. The amount of the above-mentioned component [B] is preferably 5 to 70% by mass, more preferably 10 to 60% by mass, provided that the total amount of the component [A] and the component [B] is taken as 100% by mass.

The intrinsic viscosity [n] (measured in methyl ethyl ketone at 30° C.) of the acetone-soluble fraction of the above-mentioned thermoplastic resin composition [X] is usually 0.1 to 1.5 dl/g, and preferably 0.3 to 0.7 dl/g. If the intrinsic viscosity [η] is within the above range, a physical property balance between moldability and impact resistance is excellent.

The measurement of the intrinsic viscosity [η] was performed by the following method. First, the acetone-soluble fraction (if the rubber polymer is an acrylic rubber, acetonitrile-soluble fraction) of the above-mentioned thermoplastic resin composition [X] was dissolved in methyl ethyl ketone, so that five solutions differing in concentration were prepared. A reduced viscosity was measured using a Ubbelohde viscosity tube at each concentration at 30° C., and from the measurements an intrinsic viscosity [η] was determined. The unit is dl/g.

The amount of the ethylene-α-olefin rubber polymer [a1] in the component [A] is 5 to 30% by mass, preferably 5 to 25% by mass, and particularly preferably 5 to 20% by mass, provided that the above-mentioned thermoplastic resin composition [X] is taken as 100% by mass. If the amount is less than 5% by mass, the effect of reducing squeaking noises and the moldability become poor, and if the amount exceeds 30% by mass, the heat resistance deteriorates.

The thermoplastic resin composition [X] of the present invention as mentioned above may contain, if necessary, various additives such as a filler, a nucleating agent, a lubricant, a heat stabilizer, an antioxidant, a UV absorber, a flame retardant, an antiaging agent, a plasticizer, an antibacterial agent and a colorant, as far as the object of the present invention is not impaired.

Moreover, the thermoplastic resin composition [X] of the present invention may contain, if necessary, other resins, for example, polyethylene, polypropylene, polybutylene terephthalate, polyethylene terephthalate, polyphenylene sulfide and polyamide, etc., as far as the object of the present invention is not impaired.

The thermoplastic resin composition [X] of the present invention can be produced by mixing respective components in a prescribed incorporation ratio by using a Tumbler mixer or a Henschel mixer, and then melt-kneading them under appropriate conditions by using a mixing machine such as a single screw extruder, a twin screw extruder, a Banbury mixer, a kneader, a roll and a feeder ruder. A preferred kneading machine is a twin screw extruder. In kneading respective components, it is permissible to knead the respective components at one time and it is also permissible to incorporate and knead them dividedly in multiple stages. Moreover, it is also permissible to perform pelletization by using an extruder after kneading with a Banbury mixer, a kneader, or the like. Among fillers, in the case of one in a fibrous form it is preferred to use a method of feeding it at the way of an extruder by the use of a side feeder in order to prevent cutting during kneading. The melt-kneading temperature is usually 200 to 300° C., and preferably 220 to 280° C.

The thermoplastic resin composition [X] has preferably a noise risk of 5 or less, more preferably 3 or less in every value measured under the conditions of 5N and 10N in load and 1 mm/sec and 10 mm/sec in speed, by use of the contacting parts made of the same thermoplastic resin composition [X] in a stick-slip test in which measurement is conducted by a method described in examples later using a stick-slip measuring instrument "SSP-02" manufactured by Ziegler-Instruments GmbH. According to the criteria of the German Automobile Industry Association (VDA 203-260), if the noise risk is 3 or less, the criteria is passed.

5. Structure:

The structure of the present invention comprises at least two contacting parts assembled to come into contact with each other.

The structure of the present invention includes contacting parts obtained by molding the above-described thermoplastic resin composition [X], and preferably, two or more of the contacting parts comprise molded articles made of the above-described thermoplastic resin composition [X]. There are no limitations in the method of producing the contacting parts of the present invention from the thermoplastic resin composition [X], and it can be produced by a conventional method such as injection molding, injection compression molding, gas assisted injection molding, press molding, calender molding, T-die extrusion molding, profile extrusion molding and film molding.

There are no particular limitations with respect to other members with which the contacting part of the present invention comes into contact, and examples thereof are a thermoplastic resin including the thermoplastic resin composition [X] of the present invention, a thermosetting resin, a rubber, an organic material, an inorganic material and a metallic material. The contacting parts made of the thermoplastic resin composition [X] are effective particularly when at least two contacting parts are both comprised of the thermoplastic resin composition [X], and more effective when all of the contacting parts are comprised of the thermoplastic resin composition [X] of the present invention.

Examples of the thermoplastic resin include polyvinyl chloride, polyethylene, polypropylene, AS resin, ABS resin, AES resin, ASA resin, PMMA, polystyrene, high impact polystyrene, EVA, polyamide (PA), polyethylene terephthalate, polybutylene terephthalate, polycarbonate (PC), polylactic acid, PC/ABS, PC/AES, PA/ABS and PA/AES. These can be used singly or in combination of two or more.

Examples of the thermosetting resin include phenol resin, epoxy resin, urea resin, melamine resin and unsaturated polyester resin. These can be used singly or in combination of two or more.

Examples of the rubber include various synthetic rubbers such as chloroprene rubber, polybutadiene rubber, ethylene-propylene rubber, SEBS, SBS and SIS, and natural rubbers. These can be used singly or in combination of two or more.

Examples of the organic material include an insulation board, an MDF (medium density fiberboard), a hard board, a particle board, a lumber core, an LVL (laminated veneer lumber), an OSB (oriented stack board), a PSL (Para-Lum), a WB (wafer board), a hard fiber board, a soft fiber board, a lumber core plywood, a board core plywood, a special core plywood, a veneer core plywood, a stack sheet/board of paper impregnated with a tap resin, a board produced by mixing an adhesive with fine chips/strips prepared by breaking (used) paper, and then compressing the mixture under heating, and various types of wood. These can be used singly or in combination of two or more.

Examples of the inorganic material include calcium silicate board, flexible board, homocement board, gypsum board, sheathing gypsum board, reinforced gypsum board, gypsum lath board, decorated gypsum board, composite gypsum board, various ceramics and glass. These can be used singly or in combination of two or more.

Moreover, examples of the metallic material include iron, aluminum, copper and various alloys. These can be used singly or in combination of two or more.

The contacting parts in the present invention can be suitably used as various structures in automobile interior parts, business equipment parts, housing interior parts, household electrical appliance parts, and the like, which have parts contacting, jointing or engaging other members.

The automobile interior part can remarkably reduce squeaking noises generated when it comes into contact and rubs against other members by vibration at the time of running. Moreover, it is excellent in safety at the time of collision due to its ductile fracture. Examples of such an automobile interior part include a door trim, a door lining, a pillar garnish, a console, a console box, a center panel, a door pocket, a ventilator, a duct, an air-conditioner, a meter visor, an instrument panel upper garnish, an instrument panel lower garnish, an A/T indicator, on-off switches (a slide part, a slide plate), a switch bezel, a grill front defroster, a grill side defroster, a lid cluster, a cover instrument lower, masks (e.g., a mask switch and a mask radio), a glove box, pockets (e.g., a pocket deck and a pocket card), a steering wheel horn pad, a switch part and exterior parts for car navigation. Among these, it can be used suitably for a ventilator of a car, a plate vane of a ventilator for an air-conditioner of a car, a valve shutter, a louver, a switch part, exterior parts for car navigation, and so on.

The business equipment part can remarkably reduce squeaking noises generated when it comes into contact with and rubs against other members, for example, by vibration at working of equipments and open-close of a desk drawer. Moreover, it is excellent in safety at the time of collision due to its ductile fracture. Examples of such contacting part for the business equipment part include an exterior part, an interior part, a part around a switch, a part of a movable portion, a desk rock part, a desk drawer, and so on.

The housing interior part can remarkably reduce squeaking noises generated when it comes into contact with and rubs against other members, for example, by open-close of a door and a sliding door. Moreover, it is excellent in safety at the time of collision due to its ductile fracture. Examples of such housing interior part include a shelf door, a chair damper, a folding leg movable part of a table, a door open-close damper, a sliding door rail, a curtain rail, and so on.

The household electrical appliance part can remarkably reduce generated when comes into contact with and rubs against other members, for example, by vibration at the time of working of an instrument. Examples of such household electrical appliance part include an exterior part such as a case, a housing, etc., an interior part, a part around a switch, a part of a movable portion, and the like.

EXAMPLES

Hereinafter, the present invention will be described more specifically by way of examples. However, the present invention is not limited to the examples unless departing from the spirit of the invention. In the examples, part and % are on a mass basis, unless otherwise stated.
(1) Evaluation Methods:
The measuring methods of the amount of silicon and the various evaluation items in the following Examples and Comparative Examples are described below.
(1-1) Measuring Method of the Amount of Silicon
Using an injection molding machine "EC 40" manufactured by Toshiba Machine Co., Ltd., specimens having a length of 25 mm a width of 50 mm and a thickness of 2 mm made of the thermoplastic resin compositions shown in Table 1 were injection-molded under the conditions of a cylinder temperature of 250° C., an injection pressure of 50 MPa, and a mold temperature of 60° C. Using a fluorescent X-ray analytical instrument "MagiX PRO" manufactured by PANalytial, the amount of silicon in an area of 25 mm diameter in a central portion of the specimen was measured. The results are shown in Table 1.
(1-1) Squeaking Noise Evaluation I (Noise Risk Values)

Examples 4-9, Comparative Examples 5-9

Using an injection molding machine "IS-170FA" manufactured by Toshiba Machine Co., Ltd., each of the thermoplastic resin compositions for the contacting parts 1 and 2 shown in Table 2 was injection-molded under the conditions of a cylinder temperature of 250° C., an injection pressure of 50 MPa and a mold temperature of 60° C., to obtain the injection-molded plate having a length of 150 mm, a width of 100 mm and a thickness of 4 mm.

The specimens having a length of 60 mm, a width of 100 mm and a thickness of 4 mm and a length of 50 mm, a width of 25 mm and a thickness of 4 mm were cut out by a discsaw, respectively from the above-mentioned injection-molded plate, the end portions were beveled with a sandpaper of a count #100, and fine burrs were removed by a cutter knife to thus obtain two plates of a large size and a small size as specimens of the contacting parts 1 and 2.

The two specimens of the contacting parts 1 and 2 were aged for 300 hours in an oven adjusted to 80° C.±5° C., then cooled at 25° C. for 24 hours. The large size specimen as the contacting part 1 and the small size specimen as the contacting part 2 were fixed to a stick-slip measuring instrument "SSP-02" manufactured by Ziegler-Instrument GmbH, and the squeaking noises were evaluated from noise risk values obtained by rubbing against each other at an amplitude of vibration of 20 mm three times under the conditions of loads 5N and 40N, and speeds 1 mm/sec and 10 mm/sec. As the noise risk value becomes large, occurrence risk of squeaking noises becomes high. The results are shown in Table 2.

◯: Highest noise risk value under the conditions tested: 1-3

ΔL: Highest noise risk value under the conditions tested: 4-5

X: Highest noise risk value under the conditions tested: 6-10

Examples 10

Using an injection molding machine "IS-170FA" manufactured by Toshiba Machine Co., Ltd., the thermoplastic resin composition for the contacting part 1 shown in Table 2 was injection-molded under the conditions of a cylinder temperature of 250° C., an injection pressure of 50 MPa and a mold temperature of 60° C., to obtain the injection-molded plate having a length of 150 mm, a width of 100 mm and a thickness of 4 mm.

The specimen having a length of 60 mm, a width of 100 mm and a thickness of 4 mm was cut out by a discsaw from the above-mentioned injection-molded plate, the end portions were beveled with a sandpaper of a count #100, and fine burrs were removed by a cutter knife to thus obtain the specimen of the contacting part 1.

Using an injection molding machine "IS-170FA" manufactured by Toshiba Machine Co., Ltd., polycarbonate resin "S-300 (trade name)" manufactured by Mitsubishi Engineering-Plastics Corporation, as the thermoplastic resin composition for the contacting part 2 was injection-molded under the conditions of a cylinder temperature of 270° C., an injection pressure of 50 MPa and a mold temperature of 60° C.

The specimens having a length of 50 mm, a width of 25 mm and a thickness of 4 mm was cut out by a discsaw, from the injection-molded plate with a length of 150 mm, a width of 100 mm and a thickness of 4 mm, the end portions were beveled with a sandpaper of a count #100, and fine burrs were removed by a cutter knife to thus obtain the specimen for the contacting part 2.

The two specimens of the contacting parts 1 and 2 were aged for 300 hours in an oven adjusted to 80° C.±5° C., then cooled at 25° C. for 24 hours. The large size specimen as the contacting part 1 and the small size specimen as the contacting part 2 were fixed to a stick-slip measuring instrument "SSP-02" manufactured by Ziegler-Instrument GmbH, and the squeaking noises were evaluated from noise risk values obtained by rubbing against each other at an amplitude of vibration of 20 mm three times under the conditions of loads 5N and 40N, and speeds 1 mm/sec and 10 mm/sec. As the noise risk value becomes large, occurrence risk of squeaking noises becomes high. The results are shown in Table 2.

Example 11

Using an injection molding machine "IS-170FA" manufactured by Toshiba Machine Co., Ltd., the thermoplastic resin compositions for the contacting part 1 shown in Table 2 was injection-molded under the conditions of a cylinder temperature of 250° C., an injection pressure of 50 MPa and a mold temperature of 60° C., to obtain the injection-molded plate having a length of 150 mm, a width of 100 mm and a thickness of 4 mm.

The specimen having a length of 60 mm, a width of 100 mm and a thickness of 4 mm was cut out by a discsaw from the above-mentioned injection-molded plate, the end portions were beveled with a sandpaper of a count #100, and fine burrs were removed by a cutter knife to thus obtain the specimen for the contacting part 1.

The specimen made of SUS 304 having a length of 50 mm, a width of 25 mm and a thickness of 4 mm was prepared and the end portions were beveled with a sandpaper of a count #100 and used as the specimen for the contacting part 2.

The two specimens of the contacting parts 1 and 2 were aged for 300 hours in an oven adjusted to 80° C.±5° C., then cooled at 25° C. for 24 hours. The large size specimen as the contacting part 1 and the small size specimen as the contacting part 2 were fixed to a stick-slip measuring instrument "SSP-02" manufactured by Ziegler-Instrument GmbH, and the squeaking noises were evaluated from noise risk values obtained by rubbing against each other at an amplitude of vibration of 20 mm three times under the conditions of loads 5N and 40N, and speeds 1 mm/sec and 10 mm/sec. As the noise risk value becomes large, occurrence risk of squeaking noises becomes high. The results are shown in Table 2.

Example 12

Using an injection molding machine "IS-170FA" manufactured by Toshiba Machine Co., Ltd., each of the thermoplastic resin compositions for the contacting part 1 shown in Table 2 was injection-molded under the conditions of a cylinder temperature of 250° C., an injection pressure of 50 MPa and a mold temperature of 60° C., to obtain the injection-molded plate having a length of 150 mm, a width of 100 mm and a thickness of 4 mm.

The specimen having a length of 60 mm, a width of 100 mm and a thickness of 4 mm was cut out by a discsaw from the above-mentioned injection-molded plate, the end portions were beveled with a sandpaper of a count #100, and fine burrs were removed by a cutter knife to thus obtain the specimen for the contacting part 1.

The specimen made of glass having a length of 50 mm, a width of 25 mm and a thickness of 4 mm was prepared and the end portions were beveled with a sandpaper of a count #100 and used as the specimen for the contacting part 2.

The two specimens of the contacting parts 1 and 2 were aged for 300 hours in an oven adjusted to 80° C.±5° C., then cooled at 25° C. for 24 hours. The large size specimen as the contacting part 1 and the small size specimen as the contacting part 2 were fixed to a stick-slip measuring instrument "SSP-02" manufactured by Ziegler-Instrument GmbH, and the squeaking noises were evaluated from noise risk values obtained by rubbing against each other at an amplitude of vibration of 20 mm three times under the conditions of loads 5N and 40N, and speeds 1 mm/sec and 10 mm/sec. As the noise risk value becomes large, occurrence risk of squeaking noises becomes high. The results are shown in Table 2.

(1-1) Squeaking Noise Evaluation II (Practical Use Evaluation):

Using an injection molding machine "J-100E" (model name) manufactured by The Japan Steel Works, Ltd., five ISO dumbbell specimens made of the thermoplastic resin compositions for the contacting parts 1 and 2 shown in Table 2 were injection-molded, respectively and these specimens were left at rest in a gear oven at 80° C. for 200 hours. Next, five ISO dumbbell specimens as the contacting part 1 and five ISO dumbbell specimens as the contacting part 2 were stacked one on another to form structures, and both ends thereof were twisted by hand, thereby evaluating a condition of squeaking noise generation. The evaluation was carried out five times and judgment was done on the basis of the following evaluation criteria. In addition, the dumbbell specimens left at rest for 400 hours in a gear oven were also evaluated.
Evaluation of an effect of reducing squeaking noises:
○: In all of the five evaluations, there was only slight generation of squeaking noises.
Δ: In all of the five evaluations, a case where there was remarkable generation of squeaking noises was included (a case where there was remarkable generation of squeaking noises in all of the five evaluations is removed).
X: In all of the five evaluations, there was remarkable generation of squeaking noises.

(1-3) Molded Appearance Evaluation (Silver Streaks)

Using an injection molding machine "EC40" manufactured by Toshiba Machine Co., Ltd., each of the thermoplastic resin compositions shown in Table 1 was injection-molded with a 1 mm-diameter center pin gate mold under a cylinder temperature of 250° C., an injection pressure of 80 MPa and a mold temperature of 60° C. to obtain five disc-shaped molded articles having a diameter of 80 mm and a thickness of 2 mm. The obtained five specimens were observed visually and the molded appearance was evaluated according to the following criteria. The results are shown in Table 1.
○: In all of the five specimens, there was no case where the silver streaks occurred in the neighborhood of the gate.
X: In all of the five specimens, there was included a case where the silver streaks occurred in the neighborhood of the gate.

Incidentally, the molded appearance of the structures was shown in Table 2. This judged outer appearance of the whole of the structures according to the two-rank evaluation;

◯: good X: not good

Component [A]

A-1: AES-1

A stainless steel autoclave having a volume of 20 liters equipped with a ribbon type stirrer vane, a continuous aid feeder, a thermometer, etc. was charged with 22 parts of an ethylene-α-olefin-based rubber (ethylene-propylene copolymer having an ethylene/propylene=78/22(%) and Mooney viscosity ($ML_{1+4}$, 100° C.) of 20, melting point (Tm) of 40° C., glass transition temperature (Tg) of −50° C.), 55 parts of styrene, 23 parts of acrylonitrile, 0.5 part of t-dodecyl mercaptan, and 110 parts of toluene, then the internal temperature was raised to 75° C., and then the content in the autoclave was stirred for 1 hour to form a homogeneous solution. Then, 0.45 part of t-butyl peroxyisopropyl monocarbonate was added and the inner temperature was further raised. After the inner temperature reached 100° C., a polymerization reaction was carried out at a stirring rotation speed of 100 rpm while maintaining that temperature. At a time of four hours after the start of the polymerization reaction, the internal temperature was raised to 120° C., and a reaction was further carried out for 2 hours while maintaining that temperature, so that the polymerization reaction was finished. Then, the internal temperature was cooled to 100° C., and 0.2 part of octadecyl-3-(3,5-di-t-butyl-4-hydroxyphenol)propionate and 0.02 part of dimethyl silicone oil; KF-96-100 cSt (trade name: manufactured by Shin-Etsu Silicones) were added. Then, the reaction mixture was taken out from the autoclave, an unreacted substance and a solvent were distilled off therefrom by steam distillation, and moreover volatile components were removed substantially completely by using a 40 mm φ extruder having a vent (cylinder temperature: 220° C., degree of vacuum: 760 mmHg), thereby forming pellets. The resulting ethylene-α-olefin rubber-reinforced vinyl resin had a graft ratio of 70% and the intrinsic viscosity [η] of its acetone-soluble fraction was 0.47 dl/g.

A-2: AES-2

A stainless steel autoclave having a volume of 20 liters equipped with a ribbon type stirrer vane, a continuous aid feeder, a thermometer, etc. was charged with 30 parts of an ethylene-propylene-dicyclopentadiene copolymer (ethylene/propylene/dicyclopentadiene=63/32/5(%) and a Mooney viscosity ($ML_{1+4}$, 100° C.) of 33, no melting point (Tm), and glass transition temperature (Tg) of −52° C.), in place of ethylene-α-olefin rubber polymer used in A-1, 45 parts of styrene, 25 parts of acrylonitrile, 0.5 part of t-dodecyl mercaptan, and 140 parts of toluene, then the internal temperature was raised to 75° C., and then the content in the autoclave was stirred for 1 hour to form a homogeneous solution. Then, 0.45 part of t-butyl peroxyisopropyl monocarbonate was added, and the internal temperature was further raised. After the inner temperature reached 100° C., a polymerization reaction was carried out at a stirring rotation speed of 100 rpm while maintaining that temperature. At a time of four hours after the start of the polymerization reaction, the internal temperature was raised to 120° C., and a reaction was further carried out for 2 hours while maintaining that temperature, so that the polymerization reaction was finished. Then, the internal temperature was cooled to 100° C. and 0.2 part of octadecyl-3-(3,5-di-tert-butyl-4-hydroxyphenol)propionate and 0.02 part of dimethyl silicone oil; KF-96-100 cSt (trade name: manufactured by Shim-Etsu Silicones) were added. Then, the reaction mixture was taken out from the autoclave, an unreacted substance and a solvent were distilled off therefrom by steam distillation, and moreover volatile components were removed substantially completely by using a 40 mm φ extruder having a vent (cylinder temperature: 220° C., degree of vacuum: 760 mmHg), thereby forming pellets. The resulting ethylene-α-olefin rubber-reinforced vinyl resin had a graft ratio of 60%, and the intrinsic viscosity [η] of its acetone-soluble fraction was 0.45 dl/g.

A-3: ABS-1

A polymerization vessel equipped with a stirrer was charged with 280 parts of water, 60 parts (in terms of solid) of polybutadiene latex having a weight average particle diameter of 0.26 μm and a gel fraction of 90%, 0.3 part of sodium formaldehyde sulfoxylate, 0.0025 part of ferrous sulfate, and 0.01 part of disodium ethylenediaminetetraacetate, followed by deoxygenation. After heating to 60° C. under stirring under a nitrogen flow, a monomer mixture composed of 10 parts of acrylonitrile, 30 parts of styrene, 0.2 part of t-dodecyl mercaptan, and 0.3 part of cumene hydroperoxide was dropped at 60° C. continuously over 5 hours. After completion of the dropping, the polymerization temperature was raised to 65° C., and the polymerization was completed after continuing stirring for 1 hour, so that a latex of a graft copolymer was obtained. The polymerization conversion was 98%. Then, the resulting latex was coagulated by adding 0.2 part of 2,2'-methylene-bis(4-ethylene-6-t-butylphenol) and calcium chloride thereto, and a resin composition in a powder form was obtained after washing, filtration, and drying steps. The graft ratio of the resulting resin composition was 40% and the intrinsic viscosity [η] of the acetone-soluble fraction was 0.38 dl/g.

B-1: AS-1

A synthetic apparatus obtained by connecting two jacketed polymerization reactors equipped with a ribbon type stirrer vane was used.

Each reactor was purged with nitrogen gas and the first reactor was charged continuously with a mixture of 75 parts of styrene, 25 parts of acrylonitrile and 20 parts of toluene, a solution dissolving 0.15 part of tert-dodecyl mercaptan as a molecular weight modifier in 5 parts of toluene, and a solution dissolving 0.1 part of dicumylperoxide as a polymerization initiator in 5 parts of toluene and the polymerization was conducted at 110° C. The average retention time of monomers etc., charged was 2 hours and the polymerization conversion after 2 hours was 56%.

Next, the obtained polymer solution was taken out continuously by a pump located at an exterior of the first reactor and fed to the second reactor. The amount taken out continuously was the same as fed to the first reactor. In the second reactor the polymerization was conducted at 130° C. for 2 hours and the polymerization conversion after 2 hours was 74%.

Thereafter, the polymer solution was recovered from the second reactor and introduced into a three vent-type twin-screw extruder and unreacted monomers and toluene (solvent for polymerization) were removed directly and the styrene-acrylonitrile copolymer was recovered. This styrene-acrylonitrile copolymer was used as the component [B-1]. The intrinsic viscosity [η] (methyl ethyl ketone, 30° C.) of this component [B-1] was 0.60 dl/g.

(2-2) Component [C] (Silicone Oil):

C-1: Dimethyl silicone oil; KF-96-100 cSt (trade name: produced by Shin-Etsu Silicones), whose kinematic viscosity at 25° C. was 100 cSt.

(2-3) Component [D] (Additives):

D-1: Ethylene-bisstearic acid amide; KAOWAX EB-P (trade name: produced by Kao Corp.)

D-2: 1,3,5-Tris(3,5-di-t-butyl-4-hydroxybenzyn-s-triazine-2,4,6-(1H,3H,5H)trione; ADK STAB AO-20 (trade name: produced by ADEKA Corp.)

D-3: Bis(2,4-di-t-butylphenyl)pentaerythritol diphosphite; ADK STAB PEP-24G (trade name: produced by ADEKA Corp.)

Examples 1-3 and Comparative Examples 1-4

The thermoplastic resin compositions comprising the above-described components [A] to [D] were mixed in the incorporation ratios shown in Table 1 by using a Henschel mixer, and then were kneaded in a twin screw extruder (manufactured by The Japan Steel Works, Ltd., TEX44 α, barrel preset temperature 250° C.), so that thermoplastic resin compositions X and Y were pelletized.

Using the obtained resin compositions X and Y, specimens for evaluation as described above were molded. Using the specimens obtained, evaluations were carried out by the methods described above. The results of the evaluations are shown in Table 1.

inferior in molded appearance. The resin compositions X4 and Y1 in Comparative Example 1 and Comparative Example 3 contain less amount of silicon and thus those are superior in molded appearance.

Further, as is shown in Table 2, the structures using the resin compositions X1 to X3 of the present invention represented by Examples 4 to 6 are superior in squeaking noise evaluation and molded appearance. Moreover, the structures using the same resin compositions X1, X2 and X3 for the

TABLE 1

| | | | | | | Examples | | | Comparative Examples | | | |
|---|---|---|---|---|---|---|---|---|---|---|---|---|
| | | | | | | 1 | 2 | 3 | 1 | 2 | 3 | 4 |
| | Resin compositions | | | | | X1 | X2 | X3 | X4 | X5 | Y1 | Y2 |
| Formulation | Rubber-reinforced | A-1 | AES-1 | Parts | | 50 | 50 | 50 | | 50 | | |
| | vinyl resins [A] | A-2 | AES-2 | Parts | | | | | 40 | | | |
| | | A-3 | ABS-1 | Parts | | | | | | | 25 | 25 |
| | (Co) polymer [B] | B-1 | AS-1 | Parts | | 50 | 50 | 50 | 60 | 50 | 75 | 75 |
| | Silicone oil [C] | C-1 | | Parts | | | 0.1 | 0.3 | | 0.5 | | 0.5 |
| | Additives [D] | D-1 | | Parts | | 0.5 | 0.5 | 0.5 | 0.5 | 0.5 | 0.5 | 0.5 |
| | | D-2 | | Parts | | 0.1 | 0.1 | 0.1 | 0.1 | 0.1 | 0.1 | 0.1 |
| | | D-3 | | Parts | | 0.2 | 0.2 | 0.2 | 0.2 | 0.2 | 0.2 | 0.2 |
| Amount | Rubber polymer [a1] | | | wt % | | 11 | 11 | 11 | 12 | 11 | 10 | 10 |
| | Silicon | | | wt % | | 0.0047 | 0.0508 | 0.1430 | 0.0040 | 0.2340 | 0.0000 | 0.2310 |
| Property | Acetone-soluble fraction [η] | | | dl/g | | 0.54 | 0.54 | 0.54 | 0.54 | 0.54 | 0.59 | 0.59 |
| Evaluation | Molded appearance (silver streaks) | | | | | ○ | ○ | ○ | ○ | x | ○ | x |

AES-1: 0.02 part of silicone oil was used at the time of polymerization
AES-2: 0.02 part of silicone oil was used at the time of polymerization

TABLE 2

| | | | Examples | | | | | | | | | Comparative Examples | | | | |
|---|---|---|---|---|---|---|---|---|---|---|---|---|---|---|---|---|
| Structures | | | 4 | 5 | 6 | 7 | 8 | 9 | 10 | 11 | 12 | 5 | 6 | 7 | 8 | 9 |
| Compositions for contacting part 1 | | | X1 | X2 | X3 | X1 | X1 | X1 | X1 | X1 | X1 | X4 | X5 | Y1 | Y2 | Y1 |
| Compositions for contacting part 2 | | | X1 | X2 | X3 | X3 | X5 | Y1 | Y3 | Y4 | Y5 | X4 | X5 | Y1 | Y2 | Y2 |
| Squeaking | I | 5N, 1 mm/s | 1 | 1 | 3 | 1 | 1 | 1 | 1 | 1 | 1 | 5 | 4 | 10 | 10 | 10 |
| noise | Noise risk values | 5N, 10 mm/s | 1 | 2 | 2 | 2 | 2 | 2 | 2 | 2 | 2 | 7 | 2 | 10 | 10 | 10 |
| evaluation | | 40N, 1 mm/s | 1 | 1 | 5 | 1 | 1 | 1 | 1 | 1 | 1 | 5 | 10 | 10 | 10 | 10 |
| | | 40N, 10 mm/s | 1 | 3 | 3 | 3 | 3 | 3 | 3 | 3 | 3 | 9 | 3 | 10 | 10 | 10 |
| | II | 200 hours | ○ | ○ | ○ | ○ | ○ | ○ | ○ | ○ | ○ | Δ | x | x | x | x |
| | Practical use evaluation | 400 hours | ○ | ○ | ○ | ○ | ○ | ○ | ○ | — | — | x | x | x | x | x |
| Molded appearance (silver streaks) | | | ○ | ○ | ○ | ○ | x | ○ | ○ | — | — | ○ | x | ○ | x | x |
| Recycle property | | | ○ | ○ | ○ | x | x | x | x | x | x | ○ | ○ | ○ | ○ | x |

—: Not evaluated.

Examples 4-12 and Comparative Examples 5-9

Using the resin compositions obtained in the above-mentioned Examples 1-3 and Comparative Examples 1-4, the contacting parts 1 and 2 were produced in the above-mentioned methods, and the structures were prepared by combining these contacting parts as shown in Table 2. The squeaking noise, the molded appearance and the recycle property were evaluated in the above-mentioned methods.

Moreover, using as the contacting part 2 polycarbonate [Y3], metal (stainless) [Y4] and glass [Y5], the structures combining those with the contacting part 1 were produced and evaluated in the same way as aforesaid. The evaluation results are shown in Table 2.

As is shown in Table 1, the resin compositions X1 to X3 of the present invention represented by Examples 1 to 3 are all superior in molded appearance.

In contrast, the resin compositions X5 and Y2 in Comparative Example 2 and Comparative Example 4 are cases in which the amount of silicon is too large and thus those are contacting parts 1 and 2 are good in recycle property since the separation of the resin compositions are not necessary.

The structure of Example 7 is a case in which the resin compositions X1 and X3 are combined, and this is superior in squeaking noise evaluation but inferior in recycle property.

The structure of Example 8 is a case in which the resin composition X1 and the resin composition X5 containing two much silicon, and this is superior in squeaking noise evaluation but inferior in molded appearance and recycle property.

The structures of Examples 10 to 12 are cases in which the resin composition X1 and the materials of different kinds, and those are superior in squeaking noise evaluation but inferior in recycle property since separation of the resin compositions from materials of different kinds is necessary.

On the other hand, the structure of Comparative Example 5 is a case in which as the contacting parts 1 and 2, the resin compositions X4 and X4 containing the rubber-reinforced vinyl resin [A-2] using the ethylene-α-olefin rubber polymer [a1] having no melting point (Tm) are combined, and this is inferior squeaking noise evaluation.

The structure of Comparative Example 6 is a case in which as the contacting parts 1 and 2, the resin compositions X5 and X5 containing too much silicon are combined, and this is inferior in squeaking noise evaluation and molded appearance.

The structure of Comparative Example 7 is a case in which as the contacting parts 1 and 2, the resin compositions Y1 and Y1 containing the rubber-reinforced vinyl resin [A-3] using the polybutadiene rubber polymer in place of the ethylene-α-olefin rubber polymer [a1] are combined, and this is inferior in squeaking noise evaluation.

The structure of Comparative Example 8 is a case in which as the contacting parts 1 and 2, the resin compositions Y2 and Y2 containing the rubber-reinforced vinyl resin [A-3] using the polybutadiene rubber polymer in place of the ethylene-α-olefin rubber polymer [a1] are combined, and this is inferior in squeaking noise evaluation and molded appearance.

The structure of Comparative Example 9 is a case in which as the contacting parts 1 and 2, the resin compositions Y1 and Y2 containing the rubber-reinforced vinyl resin [A-3] using the polybutadiene rubber polymer in place of the ethylene-α-olefin rubber polymer [a1] are combined, and this is inferior in squeaking noise evaluation and molded appearance, and further inferior in recycle property since separation of the resin composition Y1 from the resin composition Y2 is necessary.

As apparent from the above, it is understood that the thermoplastic resin composition of the present invention exhibits an excellent effect of reducing squeaking noise with respect to various materials, regardless of kinds of materials of the contacting parts to be assembled, and therefore it is suitable for automobile interior parts, business equipment parts, housing interior parts, household electrical appliance parts and the like, which have portions contacting, jointing or engaging with other members.

INDUSTRIAL APPLICABILITY

The thermoplastic resin composition for reduction of squeaking noises of the present invention can provide a structure comprised of contacting parts, which is characterized in that generation of squeaking noises that are generated when members rub against each other is remarkably reduced, that an effect of reducing squeaking noises is maintained without deterioration even when being placed under high temperatures for a long time, and further that impact resistance is superior. It can be used suitably for automobile interior parts, business equipment parts, housing interior parts, household electrical appliance parts, and so on, which have portions contacting, jointing or engaging with other members.

DESCRIPTION OF REFERENCE SIGNS

M Object
V Driving speed
μs Coefficient of static friction of the upper end of saw wavy form
μl Coefficient of friction of the lower end of saw wavy form
Δμ μs-μl

The invention claimed is:

1. A structure of reduced squeaking noises which comprises at least two contacting parts assembled to come into contact with each other,
wherein the at least two contacting parts are made of a thermoplastic resin composition [X] consisting of:
a rubber-reinforced vinyl resin [A] obtained by polymerizing a vinyl monomer [b1] in the presence of an ethylene-α-olefin rubber polymer [a1] consisting of ethylene and an α-olefin having melting point Tm of 0° C. or higher; and
a silicone oil, and
wherein an amount of silicon derived from the silicone oil contained in the thermoplastic resin composition [X] is 0.03% by mass or less based on 100% by mass of the thermoplastic resin composition [X].

2. The structure of reduced squeaking noises according to claim 1, wherein an amount of the ethylene-α-olefin rubber polymer [a1] is 5 to 30% by mass based on 100% by mass of the thermoplastic resin composition [X].

3. The structure of reduced squeaking noises according to claim 1, wherein the ethylene α-olefin rubber polymer [a1] consists of 5 to 95% by mass of ethylene and 95 to 5% by mass of an α-olefin (provided that the total amount of the ethylene and the α-olefin is 100% by mass).

4. The structure of reduced squeaking noises according to claim 1, wherein a graft ratio of the rubber-reinforced vinyl resin [A] is in a range of from 10 to 150% by mass, and an intrinsic viscosity [η] (measured at 30° C. in methyl ethyl ketone) of an acetone-soluble fraction of the thermoplastic resin composition [X] is in a range of from 0.1 to 1.5 dl/g.

5. The structure of reduced squeaking noises according to claim 1, wherein an intrinsic viscosity [η] (measured at 30° C. in methyl ethyl ketone) of an acetone-soluble fraction of the thermoplastic resin composition [X] is in a range of from 0.1 to 1.5 dl/g.

6. The structure of reduced squeaking noises according to claim 1, wherein the ethylene-α-olefin rubber polymer [a1] is an ethylene-propylene copolymer.

7. The structure of reduced squeaking noises according to claim 1, the amount of silicon contained in the thermoplastic resin composition [X] is 0.0047 to 0.03% by mass based on 100% by mass of the thermoplastic resin composition [X].

8. The structure of reduced squeaking noises according to claim 1, wherein a noise risk measured by a stick-slip measuring instrument SSP-02 manufactured by Zigler-Instruments GmbH is 3 or less under all measuring conditions as set forth below:
Measuring conditions
Loads: 5N, 40N
Speeds: 1 mm/sec, 10 mm/sec.

9. The structure of reduced squeaking noises according to claim 1, wherein the contacting parts are for automobile interior parts, switch parts, business equipment parts, household electrical appliance parts, desk rock parts, housing interior parts or open-close damper parts of inside doors.

10. The structure of reduced squeaking noises according to claim 1, wherein the contacting parts are a meter visor for automobile interior parts.

11. The structure of reduced squeaking noises according to claim 1, wherein the contacting parts are a center panel for automobile interior parts.

12. The structure of reduced squeaking noises according to claim 1, wherein the contacting parts are a console box for automobile interior parts.

13. The structure of reduced squeaking noises according to claim 1, wherein the contacting parts are a switch bezel for automobile interior parts.

14. A structure of reduced squeaking noises which comprises at least two contacting parts assembled to come into contact with each other,
wherein the at least two contacting parts are made of a thermoplastic resin composition [X] consisting of:
a rubber-reinforced resin containing a rubber-reinforced vinyl resin [A] obtained by polymerizing a vinyl monomer [b1] in the presence of an ethylene-α-olefin rubber polymer [a1] consisting of ethylene and an α-olefin having melting point Tm of 0° C. or higher and a (co) polymer [B] of a vinyl monomer [b2]; and a silicone oil, and
wherein an amount of silicon derived from the silicone oil contained in the thermoplastic resin composition [X] is 0.03% by mass or less based on 100% by mass of the thermoplastic resin composition [X].

* * * * *